US005930717A

United States Patent [19]

Yost et al.

[11] Patent Number: 5,930,717

[45] Date of Patent: Jul. 27, 1999

[54] SYSTEM AND METHOD USING ELLIPTICAL SEARCH AREA COVERAGE IN DETERMINING THE LOCATION OF A MOBILE TERMINAL

[75] Inventors: George P. Yost, DeSoto; Shankari Panchapakesan, Dallas, both of Tex.

[73] Assignee: Ericsson Inc, Research Triangle Park, N.C.

[21] Appl. No.: 08/903,551

[22] Filed: Jul. 30, 1997

[51] Int. Cl.$^6$ .................... H04Q 7/20

[52] U.S. Cl. .................... 455/456; 455/404; 455/457; 342/457

[58] Field of Search .................... 455/456, 457, 455/404, 521, 412, 524, 67.6; 342/457, 450, 451, 452, 463, 465; 379/45, 37

[56] References Cited

U.S. PATENT DOCUMENTS

| | | | |
|---|---|---|---|
| 5,311,569 | 5/1994 | Brozovich et al. | 379/201 |
| 5,327,144 | 7/1994 | Stilp et al. | 342/387 |
| 5,444,450 | 8/1995 | Olds et al. | 342/357 |
| 5,444,760 | 8/1995 | Russ | 379/37 |
| 5,598,460 | 1/1997 | Tendler | 455/404 |
| 5,602,903 | 2/1997 | LeBlanc et al. | 379/60 |
| 5,629,707 | 5/1997 | Heuvel et al. | 342/357 |
| 5,666,662 | 9/1997 | Shibuya | 455/456 |
| 5,724,660 | 3/1998 | Kauser et al. | 455/456 |
| 5,761,278 | 2/1997 | Pickett et al. | 455/31.2 |
| 5,805,670 | 3/1996 | Pons | 379/45 |

*Primary Examiner*—Edward F. Urban
*Assistant Examiner*—Tilamun Gesesse
*Attorney, Agent, or Firm*—Jenken & Gilchrist

[57] ABSTRACT

A system and method for improving the accuracy of a location measurement within a telecommunications system is disclosed. An elliptical search area is defined about an estimated mobile terminal location within the telecommunications system. The elliptical area is an optimum area for locating the mobile terminal, with size, eccentricity, and orientation of the ellipse being determined by the configuration of base stations, the mobile terminal's position, a desired probability of coverage, and the known measurement errors in the quantities measured by the ALI technique.

3 Claims, 3 Drawing Sheets

Y
C
E
X

SYSTEM AND METHOD USING ELLIPTICAL SEARCH AREA COVERAGE IN DETERMINING THE LOCATION OF A MOBILE TERMINAL

BACKGROUND OF THE PRESENT INVENTION

1. Field of the Invention

The present invention is directed to a system and method for improved mobile telephone location, particularly, to a system and method for identifying an elliptical area about an estimated mobile telephone location within a telecommunications system, the elliptical area being an optimum area for locating the actual mobile terminal.

2. Background and Objects of the Present Invention

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which time the mobile radio communications industry has grown by orders of magnitude, fueled by numerous technological advances that have made portable radio equipment smaller, cheaper and more reliable. The exponential growth of mobile telephony will continue in the coming decades as well, as this wireless network interacts with and eventually overtakes the existing wireline networks.

Pursuant to a recent Federal Communications Commission (FCC) Ruling and Order, cellular phone service providers within the United States must provide by October, 2001 the capability to locate the position of a cellular phone making an emergency (911) call within the provider's system to within 125 meters with at least 67% probability. In other words, the FCC requires Automatic Location Information (ALI) with a radial error no greater than 125 meters for the location of a cellular phone call with 67% probability. A Public Safety Answering Point (PSAP) would then dispatch response units to the center of this circle and instruct them to search out to a certain radius from the center in the event that the emergency is not immediately discernable or visibility is limited (fog, rain, intervening obstacles, etc.).

It should be understood that an optimum search area should include all regions where the chances of finding the caller are good and exclude regions of poor probability. All positioning algorithms known to be currently under consideration involve locating the phone with respect to known locations of base stations or satellites. While the FCC mandate is based upon a circular area, however, all the known preferred techniques predict a more elliptical, non-circular area. In other words, the errors in the known techniques are elliptical to the lowest order in the calculation, i.e., a contour of constant probability density for locating the phone is an ellipse.

Nonetheless, pursuant to the FCC directive, since the equipment must satisfy a circular requirement, a circular contour presented to the user might at first glance seem to be the appropriate solution. As is understood in the mathematical arts, when the coverage probability of an ellipse is known, to then calculate the probability bounded by a perfect circle, a non-trivial numerical integration is required. Alternatively, an approximation may be used. In view of the actual elliptical nature of the densities, however, this integration calculation is wasteful and unnecessary and increases the time before the display is ready for the PSAPs. Worse still, if the emergency is not immediately visible to the response units due to intervening buildings or terrain, the PSAP must provide directions as to where to search. In this case, the response units might have to search the entire circular area.

In many cases, however, particularly along the fringes of the coverage area, a circular region is such a poor approximation of the true error ellipse that emergency units may spend considerable vital time searching in the wrong places and not enough time searching in high probability density areas, which as discussed are actually elliptical in nature. Further, it has been found that a circle so formed and centered about the indicated position has as much as four or more times the area of the elliptical region, almost all of the extra area being unproductive.

It is, therefore, an object of the present invention to provide an improved system and method for indicating an optimal search area about the estimated location of a cellular phone caller within a telecommunications system.

It is a further object of the present invention that the improved system and method facilitate such search area definition pursuant to the FCC mandate, providing PSAPs with a tool to focus search, rescue and emergency efforts to a region having the highest probability of success, reducing the time required to locate the cellular phone caller.

SUMMARY OF THE INVENTION

The present invention is directed to a system and method for improving the accuracy of a location measurement within a telecommunications system. An elliptical search area is defined about the estimated mobile terminal location determined by an Automatic Location Information (ALI) technique within the telecommunications system, the elliptical area being an optimum area for locating the mobile terminal. The size, eccentricity and orientation of the ellipse are determined by the configuration of base stations, the mobile terminal's position, and the uncertainties of the raw measurements used by the particular ALI technique.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
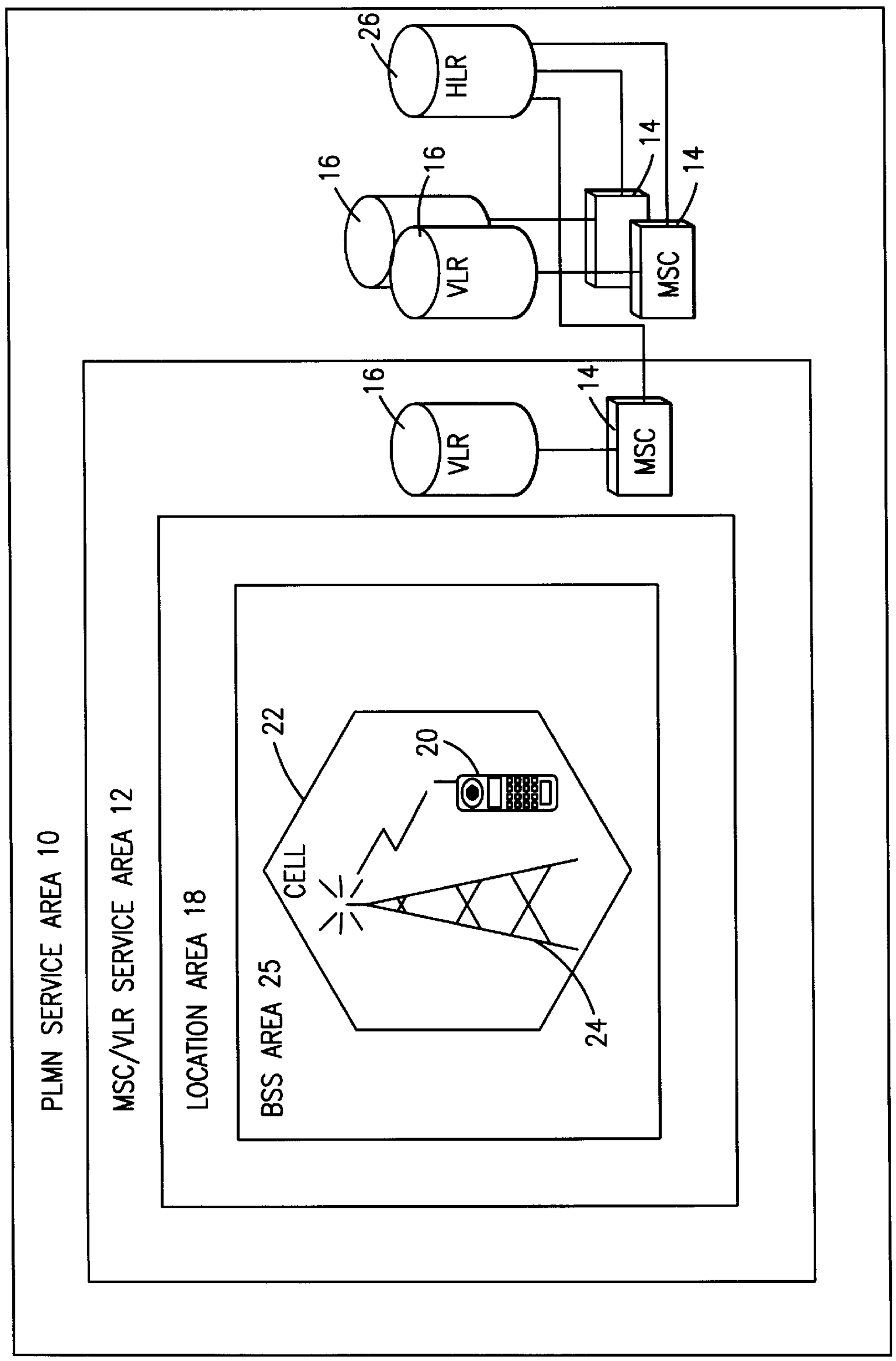
FIG. 1 is a block diagram of a telecommunications system, within which the principles of the present invention are implemented.

With reference now to FIG. 1 of the drawings, there is illustrated a Public Land Mobile Network (PLMN), such as cellular network 10, within which the hybrid mobile terminal location measurement technique of the present invention may be utilized. The network 10 is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls that LA 18. Each Location Area 12 is divided into a number of cells 22. Mobile Station (MS) 20 is the physical equipment, e.g., a car phone or other portable phone, used by mobile subscribers to communicate with the cellular network 10, each other and other wireline and wireless users outside the network 10. A Base Station (BS) 24 is the physical equipment, illustrated for simplicity as a radio tower, that provides radio coverage to the geographical area of the cell 22 in which to handle radio traffic to and from the MS 20.

With further reference to FIG. 1, the PLMN Service Area or cellular network 10 includes a Home Location Register (HLR) 26 and an MSC/VLR 14/16. The HLR is a database maintaining all subscriber information, e.g., user profiles, current serving cell location and routing information, International Mobile Subscriber Identity (IMSI) numbers, and other administrative information. The HLR 26 may be co-located with a given MSC 14, may be an integral part of the MSC 14, or may service multiple MSCs 14, the latter of which is illustrated in FIG. 1. The VLR 16 is a database containing information about all of the mobile stations 20 currently located within the MSC/VLR area 12.

Figure 2:
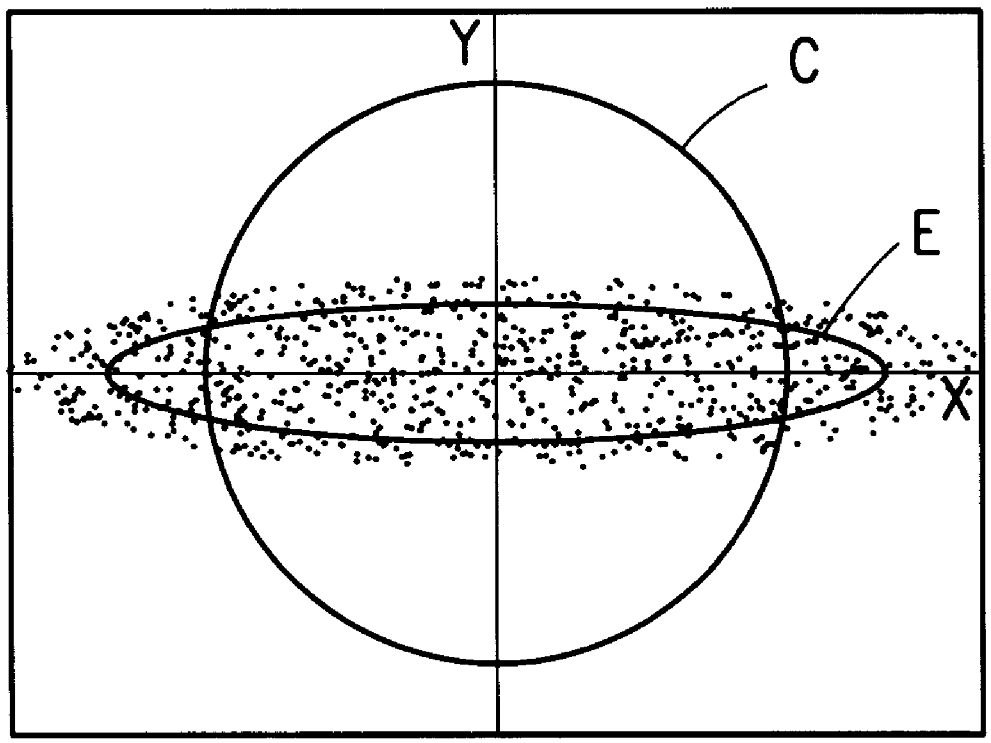
FIG. 2 is a scatter diagram of a multiplicity of location measurements of a mobile terminal about a given locus showing circular and elliptical search areas covering the same probabilities.

With reference now to FIG. 2, there is illustrated an example of a circular coverage area, referred to by the indicia C, centered about a mobile terminal 20, as shown in FIG. 1, located at the juncture of the X and Y axes. Also shown in FIG. 2 are 1000 simulated measurements, represented by individual dots, with the random measurement location error provided by the particular ALI technique utilized. As is indicated, the estimated locations (per ALI) form a substantially symmetrical and elliptical statistical sample grouping about the axes. As is understood in the statistical arts, circle C is drawn to encompass about 86.5% of the probability, i.e., two standard statistical deviations. It should, however, be understood that pursuant to the FCC directive, the circle C may instead be constructed to cover a lesser fraction of the probability, e.g., the aforementioned 67%. Then the resultant radius may be compared with the FCC 125 meter requirement.

Also shown in FIG. 2 is an ellipse E also drawn to cover 86.5% of the probability, the aforementioned two standard deviations. The circle C and ellipse E in the figure both cover the same probability and are centered at the same point. As is understood in the mathematical arts, the eccentricity (ratio of distance between foci to major axis length) of an ellipse E is larger than that of the circle C, which is 0.0. Larger eccentricity values correspond to a smaller minor axis compared with the major axis, i.e., a longer and narrower ellipse. Regarding the area of circle C shown in FIG. 2, it is about four times the area of the ellipse E. Since a large fraction of the circle C, particularly areas away from the narrow band of measurements along the major axis of the ellipse, contains none of the simulated points (dots), as is apparent from the figure, searching these empty areas most likely would be unproductive. Further, much of this unproductive area is relatively far from the center and most likely out of view from the center due to intervening obstacles, e.g., buildings. Accordingly, valuable search time would be wasted searching such remote areas.

With further reference to FIG. 2, the two fairly small distant ends of the ellipse E, along the major axis, contain or are near a substantial percentage, about 13.5%, of points not covered by the circle C. Furthermore, unlike circle C, the area about the ellipse E encompassing the uncovered points is in close proximity to the elliptical covered area. Accordingly, the majority of the non-covered points will be visible from within the immediately adjacent ellipse E. With circle C, however, the excluded points are clustered in two areas and also occur at somewhat greater distances from the circle, so that a caller in those areas might take considerable time to find.

Figure 3:
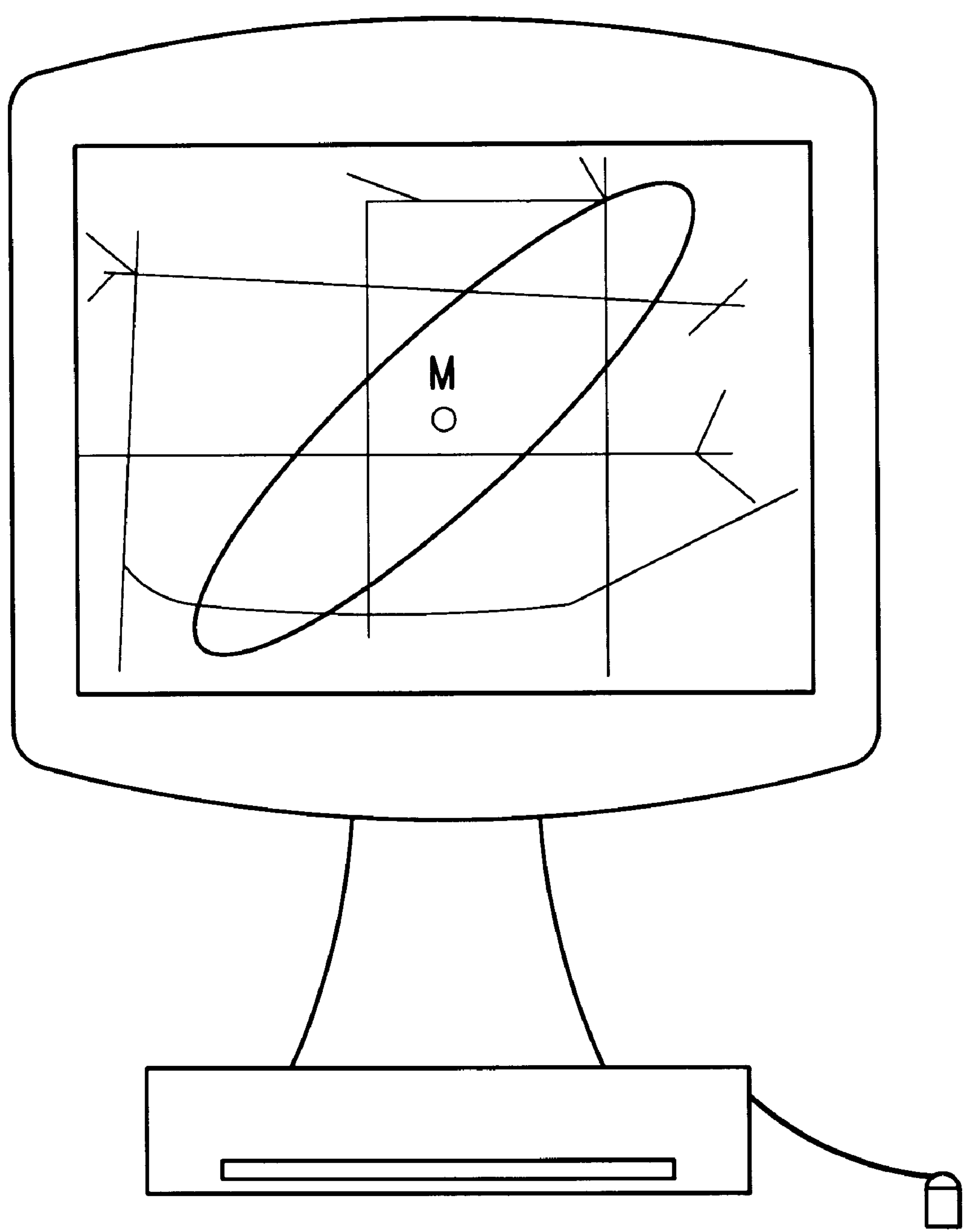
FIG. 3 is a diagram of a display device illustrating the elliptical search area of FIG. 2 on equipment in FIG. 1.

In the aforedescribed manner, the system and method of the present invention replaces the crude circular approximation technique with a more accurate elliptical search region for the emergency services to focus on. The true error ellipse, with a net coverage probability specified by the PSAP or other agency, is preferably presented to the dispatcher superimposed on a map of the area. FIG. 3 shows what a typical display 30 might look like. As illustrated in the figure, an elliptical area is superimposed on a street map. Responding units are initially dispatched to the center. The parameters of the covering ellipse E are determined by the ALI software using standard deviation techniques known in the statistical arts. Accordingly, the size of the ellipse E is determined by the desired probability of coverage and the standard errors in the quantities measured by the ALI. The eccentricity and orientation of the ellipse are determined by the geometry of the situation, as is understood by those skilled in the art.

In practicing the present invention, after constructing the ellipse pursuant to the desired statistical accuracy, the PSAP first directs the responding units to the center of the ellipse E, as mentioned above. If the distress caller and the emergency is not visible from that point, the dispatcher can then exhaustively direct the response units, e.g., along the major axis of the ellipse, more efficiently in their search than if a broader circle C were used. In this manner, regions having low probability are not searched and the search is instead focused upon the elliptical region having high probability. In the example shown, the total search area is reduced by about a factor of four. It should, nonetheless, be understood that with greater elliptical eccentricities (longer and narrower ellipses), the total area may be reduced even further, better focusing searching efforts.

By virtue of the significant reduction in the amount of area to be searched per the elliptical search strategy of the present invention, search time is reduced as well, perhaps making the difference between life and death in some situations. The technique set forth in the instant application also reduces the complexity of the system, thereby speeding up the computation time, and reducing the cost of the system.

Since in the vast majority of situations a given mobile terminal 20 is randomly positioned within a non-symmetric system 10, with the base stations 24 surrounding the terminal 20 creating an irregular coverage area, the eccentricity of the ellipse E can become quite large, offering in many cases greatly increased positional accuracy compared with a circle of the same coverage probability, as discussed. It should be understood, however, that in some situations there may exist substantial symmetry of the base stations 24 around the caller. In such an event, the eccentricity of the ellipse will be closer to 0.0 and more circular in nature. Nonetheless, even in those situations, the system and method of the present invention convey the advantages of speed and simplicity in estimating the position of the mobile. This is because the ellipse of a specified coverage probability can be quickly calculated by the normal technique of least squares estimation, whereas the radius of a circle of the same coverage probability is a tedious computation that must begin with the parameters of the ellipse as determined by the least-squares technique.

Although a minimum of 67% accuracy is now prescribed by the FCC, the present invention may employ higher measures of accuracy to better locate a mobile caller. It should, therefore, be understood that an accuracy of n standard deviations may be utilized as another parameter.

It should further be understood that the principles of the present invention may be utilized in a number of contexts. As noted, the search focusing techniques may not only be incorporated into an enhanced 911 service to enable Pubic Service Answering Points to locate the scene of an emergency, but may also be used in the location of stolen vehicles and fraud perpetrators, location of cellular calls being made during the commission of a crime or by perpetrators following a crime, and any other location-sensitive application.

It should also be understood that the principles of the present invention are applicable for any ALI technique, e.g., angle of arrival, time difference of arrival, timing advance and other such methodologies for locating mobile terminals 20 within a telecommunications system.

The previous description is of a preferred embodiment for implementing the invention, and the scope of the invention should not necessarily be limited by this description. The scope of the present invention is instead defined by the following claims.

What is claimed is:

1. A method for determining an elliptical position estimate of a mobile terminal communicating within a radiocommunication system said elliptical position estimate being an optimum are for locating the mobile terminal, said method comprising the steps of:

receiving, at a multiplicity of base stations, a signal transmitted by said mobile terminal;

forwarding, by each of said multiplicity of base stations, said received signal and Automatic Location Information (ALI) data to a central processing center; and calculating, within said central processing center, said elliptical position estimate of said mobile terminal from said ALI data, said elliptical positional estimate being based on configuration of the base stations, the mobile terminal's position, and the uncertainties of the raw measurements used by said ALI technique.

2. The method according to claim 1, further comprising the step of:

displaying said elliptical position estimate on a display device, said estimate overlaying a terrain map.

3. In a telecommunications system employing a multiplicity of base stations, a mobile terminal being in wireless communication with said base stations, circuitry within a central processing center of said telecommunications system for determining an elliptical position estimate of said mobile terminal therein said elliptical position estimate being an optimum area for locating the mobile terminal, said circuitry comprising receiving means for receiving, from each of said multiplicity of base stations, Automatic Location Information (ALI) data:

calculation means, within said central processing center, for determining said elliptical position estimate of said mobile terminal, said elliptical positional estimate being based on configuration of the base stations, the mobile terminal's position, and the uncertainties of the raw measurements used by said ALI technique; and display means, attached to said central processing center, for displaying said elliptical position estimate.

* * * * *

UNITED STATES PATENT AND TRADEMARK OFFICE

CERTIFICATE OF CORRECTION

PATENT NO. : 5,930,717

DATED : Jul. 27, 1999

INVENTOR(S) : Yost et al.

It is certified that error appears in the above-identified patent and that said Letters Patent is hereby corrected as shown below:

Column 6, line 2 — Replace "are" With --area--

Signed and Sealed this

Fourteenth Day of December, 1999

Attest:

Q. TODD DICKINSON

*Attesting Officer* — *Acting Commissioner of Patents and Trademarks*